US012440813B2

(12) United States Patent
Ballhause et al.

(10) Patent No.: US 12,440,813 B2
(45) Date of Patent: Oct. 14, 2025

(54) HOLDING CLAMP FOR HOLDING AN ANGULAR BOTTLE ON A SHAKING PLATFORM OF A LABORATORY SHAKING DEVICE

(71) Applicant: Thermo Electron LED GmbH, Langenselbold (DE)

(72) Inventors: Norman Ballhause, Osterode (DE); Mike Armbrecht, Osterode (DE)

(73) Assignee: Thermo Electron LED GmbH, Langenselbold (DE)

( * ) Notice: Subject to any disclaimer, the term of this patent is extended or adjusted under 35 U.S.C. 154(b) by 831 days.

(21) Appl. No.: 17/558,638

(22) Filed: Dec. 22, 2021

(65) Prior Publication Data

US 2022/0226790 A1 Jul. 21, 2022

(30) Foreign Application Priority Data

Jan. 15, 2021 (DE) .................... 10 2021 200 359.1

(51) Int. Cl.

| | |
|---|---|
| ***B01F 31/20*** | (2022.01) |
| ***B01F 31/22*** | (2022.01) |
| ***B01F 101/23*** | (2022.01) |
| ***B01L 9/00*** | (2006.01) |
| ***B01L 9/06*** | (2006.01) |

(52) U.S. Cl.
CPC ............ *B01F 31/201* (2022.01); *B01F 31/22* (2022.01); *B01L 9/06* (2013.01); *B01L 9/50* (2013.01); *B01F 2101/23* (2022.01)

(58) Field of Classification Search
CPC .... B01F 31/201; B01F 31/22; B01F 2101/23; B01F 35/421; B01L 9/06; B01L 9/50
(Continued)

(56) References Cited

U.S. PATENT DOCUMENTS 2,034,902 A * 3/1936 Heinze .................. A47J 43/042 366/209
5,533,700 A * 7/1996 Porter .................... B60N 3/101 248/311.2

(Continued)

FOREIGN PATENT DOCUMENTS

CN 207290092 U 5/2018
CN 207680646 U 8/2018

(Continued)

OTHER PUBLICATIONS

Ohaus Corporation, Brochure for Lab Equipment, www.ohaus.com, 2018 (122 pages).

(Continued)

*Primary Examiner* — Charles Cooley
(74) *Attorney, Agent, or Firm* — BakerHostetler

(57) ABSTRACT

A holding clamp for holding an angular bottle with flat side surfaces on a shaking platform of a laboratory shaking device, comprising a base plate having a fastening device for fastening the holding clamp on the shaking platform, at least two holding arms which protrude from the base plate and which form a vessel receiving space arranged between the holding arms, and at least one resilient tensile element which is stretched between the holding arms, wherein at least one flat contact surface designed for contact with the bottle is arranged on each of the holding arms, and in that the holding arms are designed in such a way that the flat contact surface can be brought into contact two-dimensionally with one of the flat side surfaces of the angular bottle.

19 Claims, 7 Drawing Sheets

(58) Field of Classification Search
USPC .................................................. 366/208–209
See application file for complete search history.

(56) References Cited

U.S. PATENT DOCUMENTS

| | | | | |
|---|---|---|---|---|
| 6,684,922 | B1 * | 2/2004 | Alston | B67C 9/00 211/74 |
| 9,211,511 | B2 * | 12/2015 | Demsia | H01F 7/0252 |
| 2019/0256266 | A1 | 8/2019 | Komann | |
| 2022/0226790 | A1 * | 7/2022 | Ballhause | B01F 35/421 |
| 2022/0331760 | A1 * | 10/2022 | Ballhause | B01F 31/201 |

FOREIGN PATENT DOCUMENTS

| | | | | | |
|---|---|---|---|---|---|
| CN | 209866098 | U | | 12/2019 | |
| CN | 111819677 | A | | 10/2020 | |
| CN | 212044786 | U | | 12/2020 | |
| CN | 112354445 | B | * | 2/2025 | B01F 35/717 |
| DE | 10 2016 223 156 | A1 | | 5/2018 | |
| EP | 1201297 | A1 | | 5/2002 | |
| EP | 1445307 | A1 | | 8/2004 | |
| EP | 1949955 | A1 | | 7/2008 | |
| JP | 2002-240817 | A | | 8/2002 | |
| JP | 2002-326025 | A | | 11/2002 | |
| WO | 2005107931 | A1 | | 11/2005 | |
| WO | WO-2019204260 | A1 | * | 10/2019 | B01L 9/50 |

OTHER PUBLICATIONS

Eppendorf, The Shaker Source, www.eppendorf.com/shakers, 2019 (32 pages).
German Patent Office, Office Action, Application No. 10 2021 200 359.1, dated Sep. 10, 2021 (8 pages).

* cited by examiner

HOLDING CLAMP FOR HOLDING AN ANGULAR BOTTLE ON A SHAKING PLATFORM OF A LABORATORY SHAKING DEVICE

CROSS-REFERENCE TO RELATED APPLICATION

The present application claims priority under 35 U.S.C. § 119 of German Patent Application No. 10 2021 200 359.1, filed Jan. 15, 2021, the disclosure of which is hereby incorporated herein by reference in its entirety.

FIELD OF THE INVENTION

The present invention relates to a holding clamp for holding an angular bottle with flat side surfaces on a shaking platform of a laboratory shaking device.

BACKGROUND OF THE INVENTION

Laboratory shaking devices of the generic type comprise, for example, laboratory shakers and shaking incubators and are used in a large number of laboratories, for example in the field of chemistry, pharmacy, biotechnology, microbiology, and many other fields. They are offered both as small table-top devices and as large, free-standing devices. Devices of this type may have one or more shaking platforms or trays on which a large number of different containers, for example bottles, Erlenmeyer flasks, microtiter plates, etc., can be stored. The shaking platform is moved at an adjustable speed, for example linearly back and forth, rotating in an orbital movement or in a three-dimensional tumbling movement. As a result, the contents of the containers are mixed and/or kept in movement on the shaking platform. In the case of laboratory shakers, the shaking platform is exposed in the laboratory atmosphere or is covered by a lid. Shaking incubators, on the other hand, have an interior space surrounded by a housing, in which mostly a plurality of separately or jointly moving shaking platforms is arranged and in which controlled conditions such as a specific temperature and/or air humidity and possibly a specific gas composition prevail. Laboratory shakers and shaking incubators of the generic type are described, for example, in EP 1201297 A1, WO 2005/107931 A1, EP 1445307 A1, and EP 1949955 A1 and are sold by Thermo Fisher Scientific, Inc. under the names "Fisherbrand™ Schüttler," "Thermo Scientific™ Solaris™," and "Thermo Scientific™ MaxQ™."

It is known to provide the shaking platforms of generic devices with different attachments in order to be able to advantageously fasten different containers to the shaking platforms, for example by means of holding clamps, holders, and webs. Holding clamps of the generic type are known for round containers, for example Erlenmeyer flasks and bottles. They may be fastened to the shaking platforms by means of screws, which shaking platforms have a large number of bores, so that the holding clamps can be fastened as flexibly as possible in a large number of different positions on the shaking platform. The holding clamps in turn may comprise a base plate with a fastening device for fastening the holding clamp on the shaking platform, for example likewise bores through which screws can be inserted. In addition, holding clamps of the generic type usually comprise at least two holding arms which protrude from the base plate and which form a vessel receiving space arranged between the holding arms. The holding arms are usually fastened to the base plate in such a way that they can be moved toward or away from one another in the direction of the vessel receiving space due to an elasticity inherent in the material of the holding arms, for example thin sheet metal or plastics material. At least one resilient tensile element, for example a spring, in particular a metal spring, is usually stretched between the holding arms. The holding arms can therefore be pulled apart against the tensile force of the tensile element, the tensile element then pulling the holding arms toward one another. In use, the holding arms are pulled apart against the tensile force of the tensile element, and then, for example, a bottle or an Erlenmeyer flask is placed in the vessel receiving space. Due to the tensile force of the tensile elements, the holding arms and also the tensile elements are in contact with the bottle or the Erlenmeyer flask and thereby fix them in the vessel receiving space. In particular, the elasticity of the tensile elements is used in the known holding clamps so that they follow the round contour of the container to be received and therefore lie close to it and can encompass it over a certain distance.

As extensive investigations by the inventors of the present invention have shown such known holding clamps for round containers are only poorly or not at all suitable for angular containers, for example for angular bottles with flat side surfaces. If, however, attempts are made to use the known holding clamps designed for round containers to hold an angular bottle, a plurality of problems arise. First of all, generic holding clamps may form a round receiving opening for the base of the bottle to be received in the vessel receiving space via their holding arms and at least one tensile element. This means that the base of angular containers cannot itself be used to pull the holding arms apart when the container is placed in the vessel receiving space. While round containers such as Erlenmeyer flasks can be easily inserted into the holding clamps with one hand, this does not work with angular containers. In this case, the holding arms have to be pulled apart manually, which is laborious, in order to widen the receiving opening sufficiently to accommodate the angular bottle. In addition, when a conventional holding clamp with an angular bottle is used, the tensile elements, which may be designed as metal springs, come into contact with the outer surfaces of the bottle, in particular at points on the corners of the bottle. The shaking movement of the shaking device therefore causes very selective loading of the bottle and, in particular, of the corners over a long period of time, which can result in failure of the material of the angular bottle, for example glass or plastics material. In the worst case, the vessel will break with loss or contamination of the liquid in the bottle. Finally, compared to round containers of a similar size, angular containers may have a higher holding volume, which then results in a higher total weight of the angular bottle in use. Due to the design of the conventional holding clamps, they are only in contact with the holding arms or the tensile elements on the angular bottle at certain points or, in the best case, via a contact line. The corresponding punctiform or linear contacting of the angular bottle is inadequate, however, to securely fix its heavy weight in the holding clamp. It can therefore happen during operation that the angular bottle in the holding clamp performs uncontrolled further movements in addition to the movement through the shaking platform. On the one hand, this can result in undesirable foam formation in the bottle. On the other hand, there is also the risk that the fixing of the angular bottle is so inadequate that it will detach from the holding clamp during operation, whereby the bottle is destroyed.

Against this background, an aspect of the present invention is to provide a holding clamp which is suitable for use with an angular bottle with flat side surfaces. On the one hand, it should be ensured that even in the case of such containers, a secure fixation on the shaking platform of a laboratory shaking device is ensured over long periods of time. On the other hand, the angular bottles should not be exposed to increased wear and tear during operation. In addition, simple operation is also aimed for.

SUMMARY OF THE INVENTION

Specifically, the aspect of the present invention is achieved with a holding clamp of the generic type described at the outset in that at least one flat contact surface designed for contact with the bottle is arranged on each of the holding arms, and in that the holding arms are designed in such a way that the flat contact surface can be brought into contact two-dimensionally with one of the flat side surfaces of the angular bottle. In the prior art, holding arms and all other elements of the holding clamp, which would come into contact with an angular bottle and, in particular, the flat side surfaces of an angular bottle, come into contact with the latter exclusively in the form of points or lines. According to one aspect of the present invention, it is now ensured that a flat contact surface provided for this purpose comes into contact with the angular bottle, in particular its side surfaces, two-dimensionally over a large area. This is therefore a contact surface which is two-dimensionally extended, and over the entire two-dimensional extension of which the flat contact surface can be brought into contact with the angular bottle and, in particular, its side surfaces. In this way, the entire contact surface is available for force transmission between the bottle and the holding arms, as a result of which much greater forces can be transmitted to the bottle and can also be absorbed by it. The angular bottle is therefore securely fixed in the holding clamp even when the angular bottle is heavy. In addition, point loads on the bottle are avoided, which means that there is no increased wear and tear on the contact points or contact lines. The flat contact surface can be brought into contact with the side surfaces of the angular bottle over its entire extent. It is at least 1 $cm^2$, at least 2 $cm^2$, at least 3 $cm^2$, at least 4 $cm^2$ or at least 5 $cm^2$.

In the present case, the vessel receiving space denotes that volume in the holding clamp which is provided for receiving the angular bottle. If an angular bottle is placed in the holding clamp, the vessel receiving space is completely filled by this bottle. According to the definition, all elements of the holding clamp are therefore outside the vessel receiving space. However, a distinction must be made between elements of the holding clamp that directly delimit the receiving space and those that are further away from the vessel receiving space. As soon as an angular bottle has been placed in the holding clamp, elements of the holding clamp that delimit the vessel receiving space come into contact with or rest against the holding clamp. For example, the flat contact surface arranged on the holding arms delimits the vessel receiving space. If there is an angular bottle in the holding clamp, the flat contact surfaces lie two-dimensionally over a large area against it. If an element of the holding clamp is described as "outside the vessel receiving space," this means that this element does not delimit the vessel receiving space and, in particular, does not come into contact with an angular bottle held in the holding clamp. An element arranged outside the vessel receiving space therefore does not touch the angular bottle. For this purpose, the corresponding elements are arranged sufficiently far away from the vessel receiving space so that contact with a bottle is reliably avoided in the placed state. In the present invention, it is provided, in particular, that only the contact surfaces explicitly provided for this purpose delimit the vessel receiving space and can be brought into contact with the angular bottle. This also includes, at least in part, the base plate, which forms the base of the vessel receiving space and therefore delimits it vertically downward. In contrast, all other elements of the holding clamp are arranged outside the vessel receiving space.

According to one embodiment of the present invention, it is provided that the holding arms themselves each have a flat contact surface for contacting the angular bottle. For this purpose, it is provided that the holding arms each have a holding part formed in one piece with the corresponding holding arm, the holding part having the contact surface. In other words, the holding part delimits the vessel receiving space.

In addition or as an alternative, it can be provided that a holding tab is arranged on at least one holding arm. The holding tab in turn has a contact surface and is designed in such a way that this contact surface can be brought into contact two-dimensionally with one of the flat side surfaces of the angular bottle. In other words, the contact surface of the holding tab delimits the vessel receiving space. The holding tabs are therefore arranged on the holding arms in such a way that they extend over a large area along a side surface of the vessel receiving space. If an angular bottle is placed in the holding clamp, the side surface of the vessel receiving space is replaced by the side surface of the angular bottle, so that the holding tab is two-dimensionally in contact therewith.

It can further be provided that the holding tab and, in particular, its contact surface interact with a further contact surface arranged on the same holding arm for the fixation of the angular bottle or to delimit the vessel receiving space. For example, two holding tabs, each with a contact surface, can be arranged on a holding arm. The two holding tabs and, in particular, their contact surfaces are arranged substantially perpendicular to one another and are designed to contact two flat side surfaces of the angular bottle connected over a corner. "Substantially" in relation to angle information in the present case means that a deviation of a maximum of ±15°, preferably a maximum of ±10°, particularly preferably a maximum of ±5°, in particular a maximum of ±2°, should also be included in the specific information. This applies to the entire present description. In addition, the holding tab can also interact with the contact surface on the holding arm itself. For this purpose, it may be provided that the holding tab and, in particular, its contact surface, is arranged substantially perpendicular to the holding part and, in particular, its contact surface. In this case, too, it is provided that the contact surface of the holding tab and the contact surface of the holding arm can be brought into contact with two different flat side surfaces of the angular bottle connected over a corner. In other words, the contact surfaces of the holding tabs or the holding tab and the holding arm delimit two side surfaces of the vessel receiving space which are interconnected over a corner. In this way, the holding arm securely holds a corner of the angular bottle with at least one holding tab and therefore contributes particularly reliably to the secure fixation of the bottle in the holding clamp.

In addition to or as an alternative to the contact surface directly on the holding arms themselves, it can be provided that the holding arms are equipped with a separate vessel bearing. For example, a detachable vessel bearing is arranged on the holding arms and can be fastened to the holding arm with a fastening device, the vessel bearing having the contact surface. "Detachable" means that the vessel bearing can be removed from the holding arm in a non-destructive and reversible manner and can be mounted thereon again. For this purpose, the fastening device comprises, for example, screw, plug, or clamp connections, for example with a dovetail-shaped rail and a complementary recess in the other component. It can now be provided that only the contact surface on the vessel bearing or all contact surfaces on all the vessel bearings delimit the vessel receiving space. Alternatively, it can also be provided that both the contact surfaces on the vessel bearing and the contact surfaces on the holding arms delimit the vessel receiving space and can therefore be brought into contact with the flat side surfaces of the angular bottle. The vessel bearing is designed as a separate part of the holding clamp. It therefore does not have to be made of the same material as the holding clamp and, in particular, the holding arms. While a plastics material or a metal are preferred materials for the holding arms, the vessel bearing is made of plastics material, in particular, for example, a solid but resilient plastics material, for example caoutchouc or rubber. In this way, the vessel bearing contacting the angular bottle can be manufactured from a material which, despite the shaking movements, prevents wear and tear on the angular bottle.

It can be provided that the vessel bearing has only one contact surface lying in a single plane. However, it may be provided that the detachable vessel bearing has at least two flat contact surfaces which are interconnected over a corner. The holding arm having the vessel bearing is then expediently designed in such a way that the two flat contact surfaces can be brought into two-dimensional contact with two flat side surfaces of the angular bottle, which side surfaces are connected over a corner. The contact surfaces of the vessel bearing may be arranged substantially perpendicular to one another. In other words, both contact surfaces of the vessel bearing delimit the vessel receiving space. The vessel bearing is designed to receive one of the corners of the angular bottle, so that two of the flat side surfaces of the bottle come into contact with the vessel bearing. The vessel bearing is designed, for example, as a separate component with a cuboid basic shape into which a longitudinally extending recess with a triangular cross section is formed. The contact surfaces of the vessel bearing are then formed by the two surfaces of the vessel bearing delimiting the elongated recess.

In some embodiments of the present invention, the holding arms are only interconnected via the base plate and via the at least one tensile element. In an alternative embodiment of the present invention, however, it is provided that two holding arms, for example two holding arms each, are interconnected via a connecting part in a region remote from the base plate. The connecting part, together with the two holding arms, is therefore substantially U-shaped, for example, the holding arms forming the two legs and being connected to the base plate. The connecting part, in particular, also has a flat contact surface and is designed in such a way that this flat contact surface can be brought into contact with one of the flat side surfaces of the angular bottle in a two-dimensional manner over a large area. The two connected holding arms thus project separately from one another from the base plate and are then interconnected at a distance from the base plate, in particular in the end region of the holding arms opposite the base plate. The connecting part provided for this may also be equipped with a flat contact surface which delimits the vessel receiving space. The contact surface of the connecting part may be designed parallel to the contact surface of the holding arms, in particular parallel to the contact surface of the holding parts of the holding arms. In addition, the connected holding arms and the connecting part may be made in one piece from the same material.

According to another embodiment of the present invention, the connecting part has two contact surfaces which are not formed parallel to the contact surfaces of the holding arms. In particular, it is provided that the connecting part has at least two flat contact surfaces which are interconnected over a corner, and that the holding arms connected via the connecting part are designed in such a way that the two flat contact surfaces can be brought into contact with two flat side surfaces of the angular bottle over a large area, which side surfaces are connected over a corner. The two contact surfaces of the connecting part may be arranged substantially perpendicular to one another, so that the connecting part can accommodate a corner of the angular bottle. In addition, it is preferred that the contact surfaces of the connecting part are arranged substantially at 45° with respect to the contact surfaces of the two holding arms connected via the connecting part. In this way, it is possible to accommodate the angular bottle in two different set positions in the vessel receiving space, which are substantially offset by 45° from one another. In this embodiment, it can be the case that the entire vessel receiving space is not always filled when the angular bottle is placed into the holding clamp, since portions of the vessel receiving space can only be assigned to one of the two set positions.

It is provided that the holding clamp can be operated by an operator with only one hand. An operator should therefore be able to place an angular bottle held in one hand in the holding clamp and in the vessel receiving space without having to use his second hand to do this. In order to implement this one-handed operation, it is provided that the holding arms have a guide part, the guide part being arranged on the side of the holding arm facing away from the base plate and being angled away from the vessel receiving space. Each holding arm may be such a guide part. The guide parts each form a sliding bevel, which together guide an angular bottle coming from above into the vessel receiving space in a funnel shape. The guide parts ensure that the base of the angular bottle pulls the holding arms apart against the tensile force of the tensile elements by means of a pure linear movement in the vertical direction into the vessel receiving space, thus enabling the angular bottle to be introduced into the vessel receiving space. The setting of the angular bottle in the holding clamp is therefore particularly easy and convenient for an operator to do with one hand.

As was described at the beginning, contact of the tensile elements with the angular bottle is to be avoided, in particular, so that the bottle does not wear out. It is therefore provided that the tensile element is arranged on the guide part and outside the vessel receiving space. The tensile element is therefore spaced so far from the vessel receiving space that it does not come into contact with the angular bottle placed in the vessel receiving space. This may apply to all tensile elements of the holding clamp according to one aspect of the present invention. The at least one and, in particular, all of the tensile elements is/are, for example, directly connected to the holding arms and/or the holding tabs.

Alternatively, it can be provided that the holding arms each have at least one spacer tab, which is arranged outside the vessel receiving space and, in particular, protrudes from the corresponding holding arm in the direction away from the vessel receiving space, the tensile element being arranged on the spacer tabs of two adjacent holding arms. The spacer tabs are designed to provide connection points for the at least one tensile element. The tensile element may therefore be fastened to the spacer tabs and stretched between the holding arms via the spacer tabs. In one embodiment of the present invention, each individual holding arm has two spacer tabs and is connected to an adjacent holding arm via a tensile element arranged on these spacer tabs. In the event that two holding arms are connected to a connecting part, each holding arm may have only one spacer tab.

In particular, the spacer tabs should ensure that at least one tensile element, preferably all tensile elements, is/are arranged sufficiently far away from the vessel receiving space so that it does not come into contact with the angular bottle when it is in the vessel receiving space. It may be therefore provided that the spacer tabs and the tensile element are designed in such a way that the tensile element is arranged outside the vessel receiving space, the spacer tabs being arranged, in particular, on the guide part. The guide part also protrudes at least slightly away from the vessel receiving space, so that the distance between the tensile elements and the vessel receiving space is increased again by arranging the spacer tabs on the guide part. The spacer tabs can, however, alternatively also be arranged on the holding arm itself, on the connecting part, or on the vessel bearing.

The described embodiment with spacer tabs, which ensure that the tensile elements are arranged outside the vessel receiving space, represents an independent, separate invention and can therefore also be implemented without the two-dimensional contacting of the angular bottle by the contact surfaces over a large area. Specifically, the present invention therefore also relates to a holding clamp of the generic type described at the outset, which is only characterized in that the holding arms each have at least one spacer tab which is arranged outside the vessel receiving space and, in particular, protrudes from the corresponding holding arm in the direction away from the vessel receiving space, the tensile element being arranged on the spacer tabs of two adjacent holding arms. For this independent and separate embodiment, the developments, features, and effects described above as described below, including a development with the flat contact, also apply analogously, so that these are not described again merely to avoid repetitions.

If an angular bottle is placed in the vessel receiving space of the holding clamp, the at least one tensile element is provided to press the contact surfaces of the holding clamp against the side surfaces of the angular bottle in order to fix the bottle. This applies, in particular, to all tensile elements. In order to achieve this as reliably as possible, provision is made for two tensile elements to be arranged on two opposite sides of the vessel receiving space. The direction of the tensile force caused by these tensile elements is parallel to one another. In particular, in embodiments in which two holding arms are connected via a connecting part, these tensile elements are sufficient and expediently connect one of the holding arms connected via a first connecting part to a holding arm opposite via the vessel receiving space, which opposite holding arm is connected via a second connecting part to the further holding arm on the opposite side. In other embodiments, a total of four tensile elements are provided, two tensile elements each being arranged on two opposite sides of the vessel receiving space. In this case, too, the opposite tensile elements have a parallel direction of the tensile force caused by them. In contrast, the direction of the tensile force of the two pairs of opposite tensile elements caused by the tensile elements is offset by substantially 90° to one another in the case of the four tensile elements. The direction of the tensile force of the tensile elements can be arranged, for example, parallel to the side surfaces of the vessel receiving space or the side surfaces of the angular bottle. In this case, the tensile elements are stretched parallel to the side surfaces. Alternatively, the direction of the tensile force of the tensile elements can also be arranged to be offset, for example, by substantially 45° to the side surfaces of the vessel receiving space or the side surfaces of the angular bottle. In this case, the tensile elements are stretched over a corner of the angular bottles or the vessel receiving space.

In principle, it is also common for holding clamps for round bottles to offer and use different holding clamps for different bottle sizes. This is also the case with the holding clamp according to one aspect of the present invention for angular bottles. On the other hand, the holding clamp should not only be usable with an exactly standardized bottle size, so that at least a certain amount of leeway for different bottle sizes should be covered by the holding clamp according to one aspect of the present invention. In particular, in the case of a holding clamp for angular bottles, however, it should be ensured that there is still flat contact between the contact surfaces and the side surfaces of the angular bottle, even if this has a slight difference in size. This is not a problem with conventional holding clamps for round bottles, but it poses a challenge for holding clamps for angular bottles. For this purpose, it is therefore provided that at least one holding arm, preferably all holding arms, has/have a deformation arc, the deformation arc being designed in such a way that the distance between two opposite holding arms with respect to the vessel receiving space can be changed. The movement of the holding arm carried out in this case is not to be confused with the expansion movement of the holding arm in the region remote from the base plate for placing a bottle. In addition to this expansion movement, the deformation arc allows the holding arms to be linearly displaceable away from the base plate at least slightly in a direction perpendicular to their direction of extension also in a region adjacent to the base plate. In other words, the corresponding direction is parallel to the surface extension of the base plate and, viewed from a holding arm, is directed in the direction of a holding arm or away from it, which holding arm is opposite the vessel receiving space. The deformation arc is thus designed in such a way that it allows for or provides elasticity of the holding arms in this direction. In this way, angular bottles of different sizes can be used with one and the same holding clamp, the order of magnitude of the differences in expansion of the angular bottle being in the range of a few millimeters. In order to ensure a secure fixation of the bottles in the holding clamp, it is necessary to use differently dimensioned holding clamps if there are major differences. The deformation arc is basically designed as an angular or round U-shaped arc in the holding arm in the vicinity of the base plate, in one piece with and made of the same material as the holding arm. The bulge or bulging of the deformation arc is arranged outside the vessel receiving space.

The holding arm may be fastened to the base plate via the deformation arc. In particular, the deformation arc is arranged between the base plate and the contact surface on the holding arm. In this case, the elasticity of the deformation arc also helps with the pivoting movement of the holding arms, for example when they are pulled apart on their side opposite the base plate in order to insert an angular bottle.

The fastening of the angular bottle in the holding clamp works particularly well if two holding arms which are opposite the vessel receiving space are pulled toward one another via at least one tensile element. In this case, it is advantageous if the at least one tensile element is arranged in the region of the holding arms facing away from the base plate. In one embodiment of the present invention, it is provided, for example, that two holding arms that are opposite one another and the distance of which from one another can be changed by means of at least one deformation arc are interconnected via at least one tensile element. However, the holding arms do not have to be interconnected directly via the at least one tensile element; for example, the connection can also be established via a further holding arm and a further tensile element up to the opposite holding arm. It is important that, in the end, all holding arms in the direction of the vessel receiving space are acted upon by the tensile elements with a force when an angular bottle is located in the vessel receiving space.

The present invention comprises a number of different design options for the base plate and/or the holding arms. The base plate and/or the holding arms are made, for example, of a metal, for example a sheet metal, or a plastics material. The base plate is designed in one piece with the holding arms and, in particular, is made from the same material. For example, a minimum of exactly two holding arms can be used, which are arranged opposite one another on the base plate with respect to the vessel receiving space. Three holding arms are also possible. However, there are exactly four holding arms, in particular holding arms of the same design. The holding arms can, for example, be arranged symmetrically on the base plate around the vessel receiving space. The holding arms may protrude substantially perpendicularly from the base plate. The base plate itself can have different basic shapes, for example. For example, the base plate can be round or oval. However, the base plate may have a rectangular, in particular square, basic shape. This basic shape can be modified, in particular in the corner regions, by attaching the holding arms to the base plate, for example by not designing the corners of the rectangular basic shape as such, since the holding arms are attached there. The base plate is basically designed as a flat component extending two-dimensionally. It has an upper side which forms the base of the vessel receiving space and delimits it vertically downward. The holding arms protrude from the upper side of the base plate. In addition, the base plate has an underside which is designed to be fastened to the shaker platform of the laboratory shaking device and to come into contact therewith. In addition, the base plate has an outer circumference which represents the transition from the upper side to the bottom and thus forms the outer edge of the base plate. In other words, the outer circumference of the base plate is its end faces. It may be provided that the holding arms are arranged on the outer circumference of the base plate. The holding arms are therefore not connected to the upper side of the base plate but to the outer circumference. In addition, the holding arms may be arranged opposite one another with respect to the base plate and/or the vessel receiving space. In this way, the base plate and the holding arms form a vessel receiving space in which an angular bottle can be particularly securely fixed. The holding arms can now be designed to contact the side surfaces of the angular bottle with the contact surfaces. In this case, in particular, the corners of the angular bottle are free and are located, for example, between the contact surfaces of the holding arms. Alternatively, it is possible that the holding arms are designed to contact the corners of the angular bottle with the contact surfaces. In this case, however, the side surfaces of the angular bottle that are interconnected over the corner are also at least partially contacted. In the present case, contacting the corners is also understood to mean contacting the two side surfaces of the angular bottle connected over the corner. By making contact with the corners of the angular bottle, a particularly secure bearing in the holding clamp is achieved. It is particularly preferred that the holding arms, together with the at least one tensile element, in particular all tensile elements, form an opening ring which completely surrounds the vessel receiving space on the side of the holding clamp facing away from the base plate. The opening ring thus forms the opening through which an angular bottle can be placed in the vessel receiving space or in the holding clamp. The opening ring is therefore arranged on the side of the holding clamp opposite the base plate. It is also designed with a rectangular, for example square, basic shape. Alternatively, an octagonal opening ring can also be provided. The corners of the opening ring can be formed, for example, by contact surfaces interconnected over corners. In addition to the holding arms and the tensile elements, other components of the holding clamp can also contribute to the formation of the opening ring, for example the guide parts, the spacer tabs, the holding tabs, and the connecting parts. In this case, the opening ring is additionally formed by one or more elements of a group that comprises the components described.

Further embodiments of the present invention with regard to the holding arms are characterized in that the holding arms are arranged, for example, on the sides of the outer circumference of a base plate with a rectangular basic shape. This means, for example, that the holding arms are not arranged at the corners, but, in particular, in the region between the corners of the base plate with a rectangular basic shape. For example, a holding arm can be arranged on each of the sides of the outer circumference of the base plate with a rectangular basic shape. For example, the holding arms can be arranged centrally on the sides of the outer circumference of the base plate. In this case, the holding arms are arranged exactly in the middle between the corners of the base plate on its outer circumference. Alternatively, the holding arms can also be arranged offset off-center on the sides of the outer circumference of the base plate. In this case, the holding arms are thus arranged offset along one of the sides of the outer circumference toward one of the corners of the base plate, for example in the region adjacent to one of the corners. For example, at least one holding arm, preferably all holding arms, can be arranged on the side of the outer circumference of the base plate but can reach up to one of the corners. In addition, it can be provided, for example, that two holding arms are arranged on two opposite sides of the outer circumference of the base plate, the other two sides of the outer circumference of the base plate, in particular, not having any holding arms. The holding arms arranged in each case on one side of the outer circumference of the base plate can, for example, be interconnected, as already described above, i.e., have a connecting part.

It can also be provided, for example, that the holding arms are arranged at the corners of the outer circumference of the base plate. For example, a holding arm can be arranged at each of the corners of the outer circumference of the base plate. In this embodiment, an extension of the holding arms, in particular the holding part and/or the contact surface, over a large area, may be arranged offset substantially by 45° with respect to the sides of the outer circumference of the base plate.

In addition to the holding clamp described above, the present invention also relates to a set comprising such a holding clamp and an angular bottle, in particular an angular bottle accommodated in the vessel receiving space. In addition, the present invention also relates to a laboratory shaking device with a holding clamp as described above. For these aspects of the present invention, to avoid repetition, reference is made to the explanations relating to the holding clamp. All the features, effects, and advantages described for the holding clamp also apply in a figurative sense to the set according to one aspect of the present invention and the laboratory shaking device with the holding clamp.

BRIEF DESCRIPTION OF THE DRAWINGS

The present invention is described in more detail below with reference to the embodiments shown in the figures without the present invention being restricted to these embodiments. Schematically, in the drawings.

Identical or identically-acting components are numbered with the same reference signs in the figures. Repeated components are not identified separately in each figure.

DETAILED DESCRIPTION OF THE INVENTION

Figure 1:
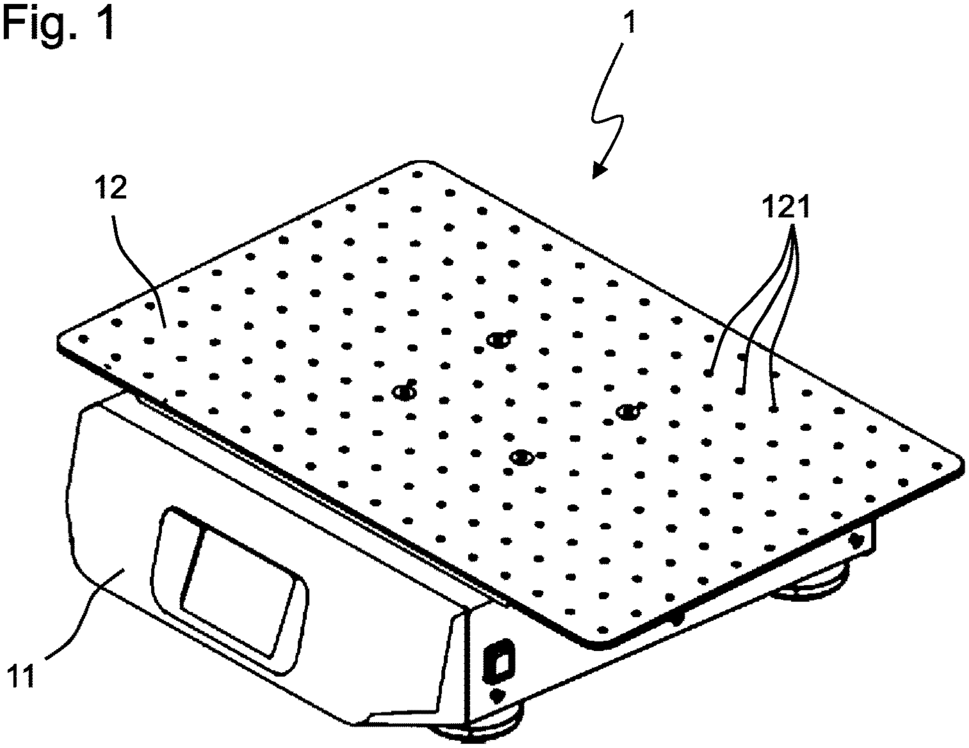
FIG. 1 shows a laboratory shaker with a shaking platform.

FIG. 1 shows a laboratory shaker 1 having a housing part 11 and a shaking platform 12. In the housing part 11, for example, control electronics and a drive motor are accommodated, which are used to set the shaking platform 12 in shaking movements when the laboratory shaker 1 is in operation. In this way, for example, liquids that are in containers that are placed on the shaking platform 12 are mixed and kept in movement. For fastening a holding clamp according to one aspect of the present invention, the shaking platform 12 has fastening points 121, for example bores, through which screws can be inserted.

Figure 2:
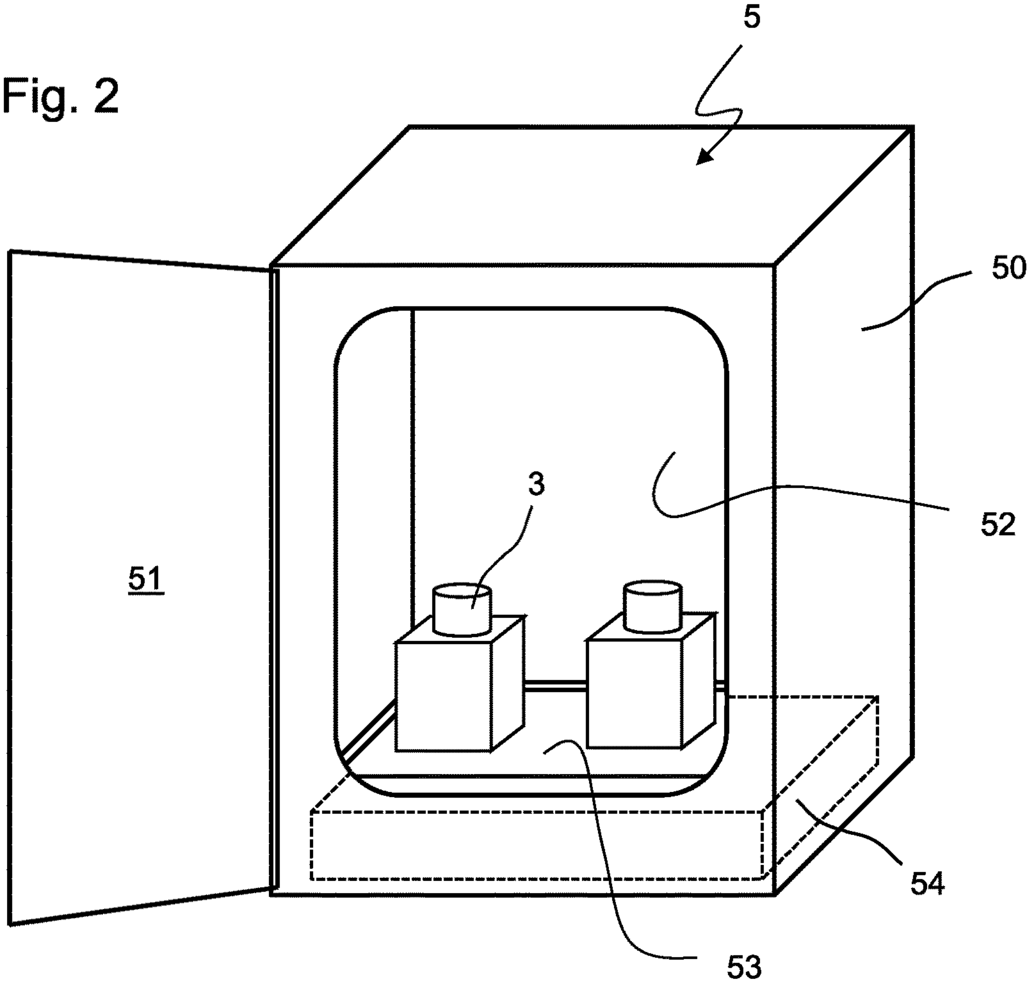
FIG. 2 shows a shaking incubator with a shaking platform.

FIG. 2 shows a shaking incubator 5 which differs from the laboratory shaker 1 according to FIG. 1 substantially by a housing 50 which surrounds an interior space 52 which can be closed by a door 51, in which interior space a shaking platform 53 is arranged. Fastening points for holding clamps or similar structures are also provided on the shaking platform 53 (not shown separately in this case). In the case of the holding clamps, which are not shown separately in this case for reasons of clarity, for example angular bottles 3 or other angular vessels can be fixed on the shaking platform 53. The shaking platform 53 is moved by means of a drive apparatus 54 arranged in this case in the floor region of the incubator. In the interior space 52, a desired temperature and/or a desired composition of the interior atmosphere, such as, for example, a predetermined air humidity, can be set in a manner known per se. To set up the sample vessels, instead of one, there can also be a plurality of shaking platforms 53 in the interior space, which shaking platforms are also set in motion by means of the drive apparatus 54.

A number of specific embodiments of the holding clamp are described below. To avoid repetition, not all details of all embodiments are repeated again. It is therefore also included overall according to one aspect of the present invention that individual features of the embodiments are transferred to the corresponding other embodiments and vice versa, even if the corresponding combination is not mentioned verbatim. In principle, any combinations of two or more features from the various embodiments are possible if they are not discernibly mutually exclusive and encompassed within the scope of the present invention.

Figure 3:
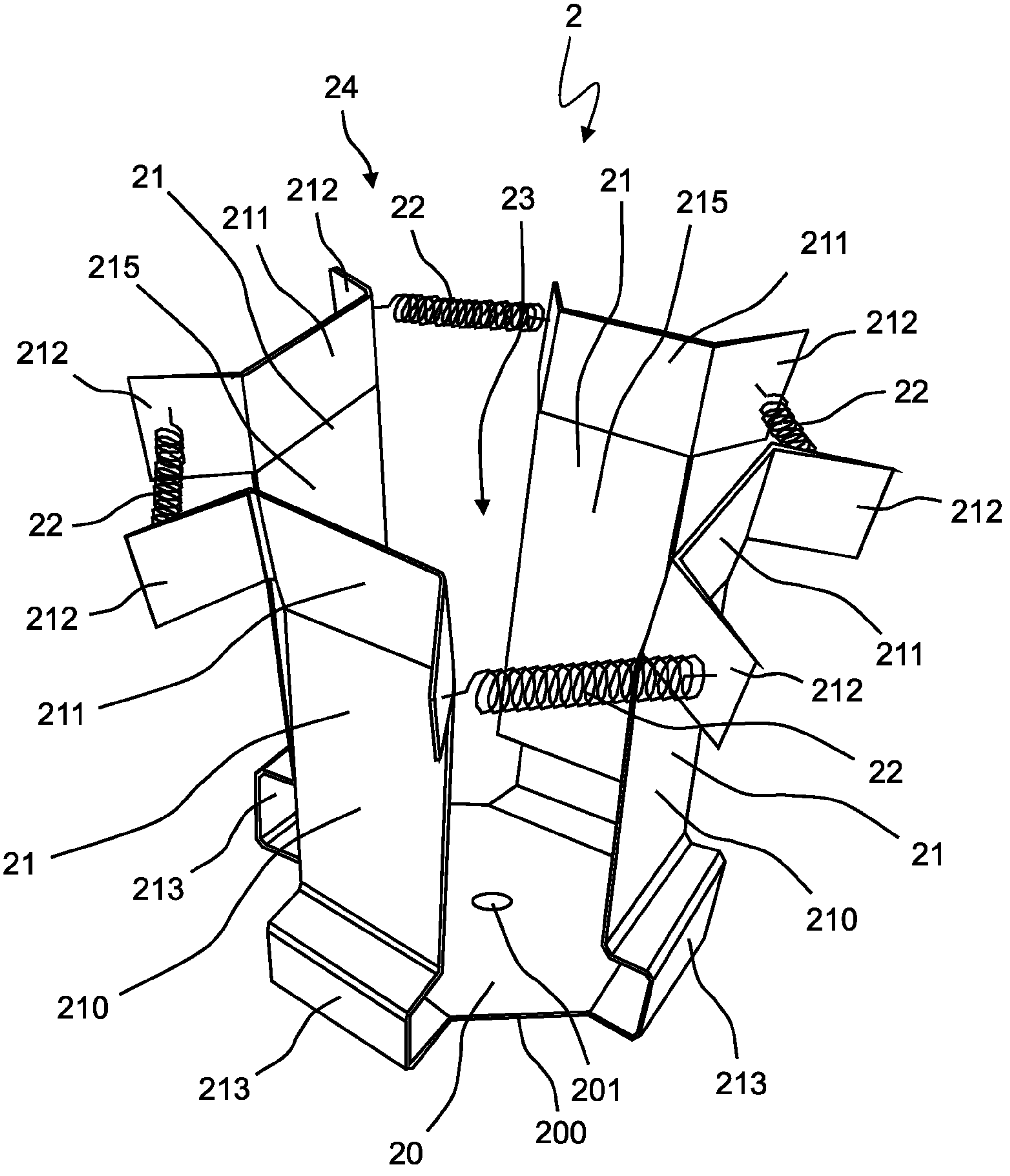
FIG. 3 shows a first embodiment of a holding clamp.

FIG. 3 shows a first embodiment of a holding clamp 2. The holding clamp 2 is designed to fasten an angular bottle 3 on a shaking platform 12, 53 of one of the laboratory shaking devices 1, 5. For this purpose, the holding clamp 2 has a base plate 20, the circumferential edge of which is referred to as the outer circumference 200. The base plate 20 has at least one fastening device 201 which is used to fasten the base plate 20 and thus the holding clamp 2 on a shaking platform 12, 53. For example, the fastening device 201 comprises a bore through which a screw can be inserted. In the embodiment shown, four holding arms 21 protrude substantially vertically from the base plate 20. The holding arms 21 are formed, for example, from a metal sheet or a flat plastics material plate. Together with the base plate 20, they surround a vessel receiving space 23 in which an angular bottle 3, as will be described in more detail below, can be received.

The holding arms 21 are each arranged via a deformation arc 213 on the outer circumference 200 of the base plate 20, in particular at the corners of the base plate 20, which has a substantially rectangular basic shape, the corners being cut off by the arrangement of the holding arms. The deformation arcs 213 are each formed as outwardly protruding U-shaped bulges of the holding arms 21 and ensure that the holding arms 21 can, on the one hand, perform a pivoting movement on their bearing on the base plate 20 and, on the other hand, the distance to the corresponding opposite holding arm 21 can be increased, as will be described in more detail below. In the embodiment shown in FIG. 3, the deformation arcs 213 are angular, with a beveled U-shaped course.

In addition, the holding arms 21 each have a holding part 210, which in turn comprises a flat contact surface 215. The contact surface 215 is designed in such a way that it delimits the vessel receiving space 23. This vessel receiving space is also delimited by the upper side of the base plate 20. All other elements of the holding clamp 2 are arranged outside of the vessel receiving space 23. The contact surfaces 215 are designed, in particular, to lie over a large area against the side surfaces of the angular bottle 3 as soon as it is placed into the holding clamp 2. Due to the two-dimensional contact of the bottle 3 with the contact surfaces 215 of the holding arms 21 over a large area, these holding arms are able to hold even a heavy, angular bottle 3 securely in the holding clamp 2.

In the embodiment shown, the holding arms 21 each have a guide part 211 on the side opposite the base plate 20. The guide part 211 is angled outward with respect to the holding arms 21 and, in particular, the holding part 210 or the contact surface 215. On their side facing the vessel receiving space 23, the guide parts 211 therefore each form a sliding bevel that can be used as a guide for the base of an angular bottle 3 in order to guide the angular bottle 3 into the vessel receiving space 23 from above.

Furthermore, two spacer tabs 212 are arranged on each of the holding arms 21, specifically on the guide parts 211 in the embodiment in FIG. 3. The spacer tabs 212, like the guide parts 211, are designed in one piece with the holding arms 21 and protrude away from the vessel receiving space 23. This is also the purpose of the spacer tabs 212, which are designed to fasten the tensile elements 22, which in turn are designed, for example, as spiral springs made of metal. The tensile elements 22 should be arranged outside the vessel receiving space 23 in order to reliably avoid contact of the tensile elements 22 with an angular bottle 3 located in the vessel receiving space 23. In each case, a spacer tab 212 is arranged on those sides of a holding arm 21 which are closest to the respective adjacent holding arms 21. In addition, the spacer tabs 212 are arranged on the end of the holding arms 21 opposite the base plate 20. A tensile element 22 is in each case stretched between adjacent holding arms 21 via the spacer tabs 212. Each holding arm 21 is therefore connected to two further holding arms 21 via two tensile elements 22. Overall, the holding arms 21 having the guide parts 211, the spacer tabs 212, and the tensile elements 22 form an opening ring 24 which represents an access opening for an angular bottle 3 into the vessel receiving space 23.

Figure 4:
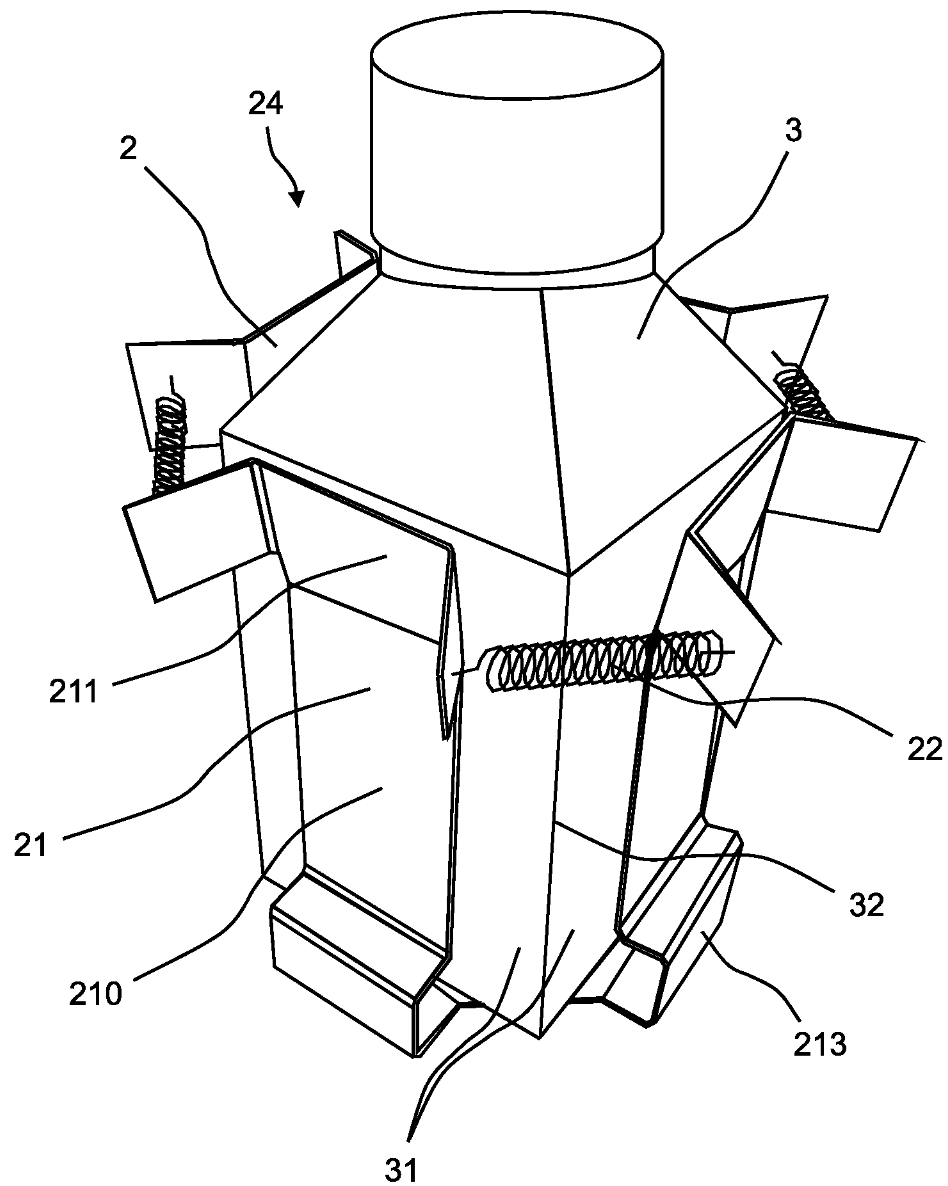
FIG. 4 shows the holding clamp according to FIG. 3 with an angular bottle accommodated in the vessel receiving space.

The introduction of an angular bottle 3 into the vessel receiving space 23 is described using the embodiment of the holding clamp 2 according to FIG. 3 with reference to FIG. 4. The angular bottle 3 has flat side surfaces 31 which are each interconnected over a corner 32. In addition, the bottle 3 has a base which is not visible in the selected representation. In order to set the angular bottle in the holding clamp 2, the bottle 3 is moved into the opening ring 24 of the holding clamp 2, coming from above. In the case of the base and/or the side surfaces 31, the bottle 3 slides along the sliding surfaces formed by the guide parts 211, as a result of which, when the bottle 3 is lowered further, the distance between the opposite holding arms 21 increases and the opening ring 24 expands, the tensile elements 22 being stretched. The holding arms 21 are moved apart until the body of the angular bottle 3 fits between the holding arms 21 and, in particular, between the holding parts 210. The bottle 3 then slides along the holding parts 210 when it is lowered further. Depending on the size of the bottle 3, the deformation arcs 213 can cause the holding arms 21 and, in particular, the holding parts 210 to be pushed away from the vessel receiving space 23, thus increasing the distance between two opposite holding arms 21. In this way, the bottle 3 is lowered until it rests on the base plate 20. The tensile elements 22 ensure that the opening ring 24 assumes its smallest possible widening, as a result of which the contact surfaces 215 come into two-dimensional contact with the side surfaces 31 of the angular bottle 3 over a large area. This bottle is now fixed by the contact with the holding arms 21 and by the tensile stress of the tensile element 22 in the holding clamp 2 in such a way that it follows the defined movements of the shaking platform 12, 53 and there is no risk of the bottle 3 becoming detached from the holding clamp 2.

To insert the bottle 3 into the holding clamp 2, it is only necessary to lower the bottle 3 vertically into the vessel receiving space 23, coming from above. The entire adjustment of the holding arms 21 to precisely accommodate and ensure the contact of the contact surfaces 215 on the bottle 3 over a large area is achieved by resilient deformation of the holding clamp 2, in particular on the deformation arcs 213 and the tensile elements 22. An operator who therefore grips the bottle 3 with one hand in the region of its lid, for example, can place the bottle 3 in the holding clamp 2 or in the vessel receiving space 23 in a simple and uncomplicated manner without the aid of a second hand. Such one-handed operation is particularly helpful in the laboratory environment.

Figure 5:
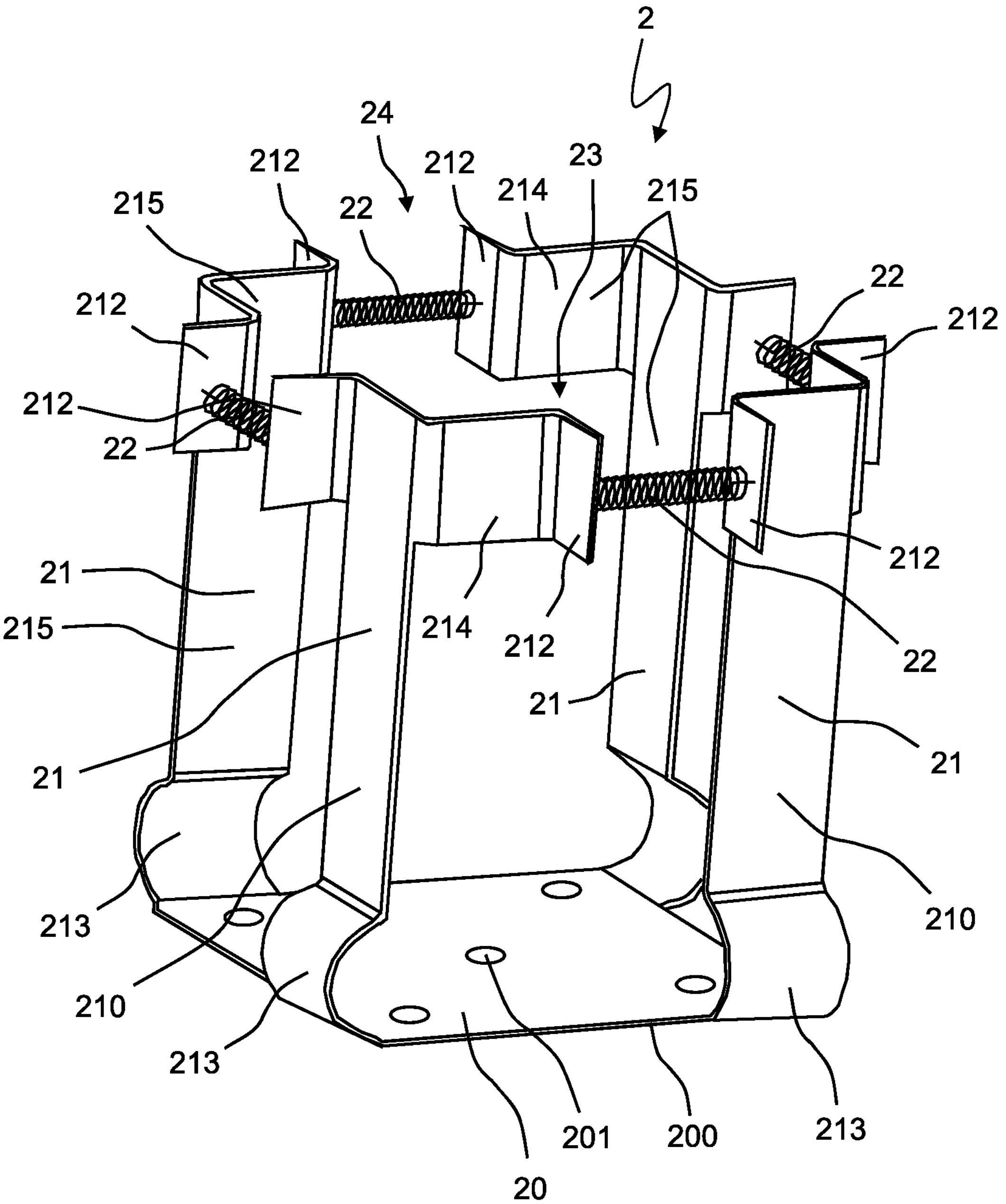
FIG. 5 shows a second embodiment of a holding clamp.

An alternative embodiment of the holding clamp 2 is shown in FIG. 5. This holding clamp 2 also comprises a base plate 20 with a rectangular basic shape. In particular, the base plate 20 is designed to be square and has a plurality of bores as a fastening device 201. The holding arms 21 are arranged on the sides of the outer circumference 200 of the base plate 20 and offset off-center. Specifically, the holding arms 21 are fastened to the sides of the outer circumference 200 in such a way that they each touch a corner of the base plate 20 or are flush with the corner. In this embodiment, too, each holding arm 21 has a deformation arc 213. The deformation arcs 213 are in the present case designed as round, U-shaped bulges of the holding arms 21. In contrast to the previous embodiment of the holding clamp 2, that of FIG. 5 has no guide parts 211. A further embodiment (not shown) of the holding clamp 2 therefore substantially corresponds to that of FIG. 5, but this embodiment comprises additional guide parts 211.

In addition to the contact surfaces 215 of the holding parts 210 of the holding arms 21, the embodiment according to FIG. 5 also comprises an additional holding tab 214 per holding arm 21. In other words, each holding arm 21 of the embodiment is equipped with a holding tab 214. This is, in particular, formed at the same vertical height as the contact surface 215 of the holding part 210. In addition, the holding tabs 214 are arranged on the side of the holding arms 21 facing away from the base plate 20. Since each holding arm 21 has a holding tab 214 on only one side, the holding arms 21 are overall asymmetrical. Each of the holding tabs 214 comprises, on its side facing the vessel receiving space 23, a flat contact surface 215, which is also designed to be able to be brought into contact two-dimensionally with one of the flat side surfaces 31 of the angular bottle 3 over a large area. In other words, this contact surface 215 also delimits the vessel receiving space 23. In particular, the holding tabs 214 protrude laterally from the holding parts 210 of the holding arms 21 and are designed in such a way that the contact surfaces 215 of the holding tabs 214 are aligned substantially perpendicular to the contact surfaces 215 of the holding parts 210. In this way, each of the holding arms 21 can contact a corner 31 of the angular bottle 3 in the vessel receiving space 23 with the contact surfaces 215 of the holding parts 210 and the holding tabs 214, such that the contact surfaces 215 are in contact with two flat side surfaces 31 of the bottle 3 connected over a corner 32.

In each case, one of the spacer tabs 212 of the holding arms 21 is arranged on one of the holding tabs 214. In the embodiment according to FIG. 5, the opening ring 24 is therefore formed overall by the holding arms 21 or their holding parts 210, the holding tabs 214, the spacer tabs 212, and the tensile elements 22. Because the embodiment according to FIG. 5 does not have a guide part 211, the contact surface 215 of the holding part 210 and also the holding part 210 itself extend from the deformation arc 213 to the end of the holding arm 21 facing away from the base plate 20. The contact surface between the holding arm 21 and the side surfaces 31 of the bottle 3 are therefore particularly large, which contributes to a particularly secure fixation of the bottle 3.

Figure 6:
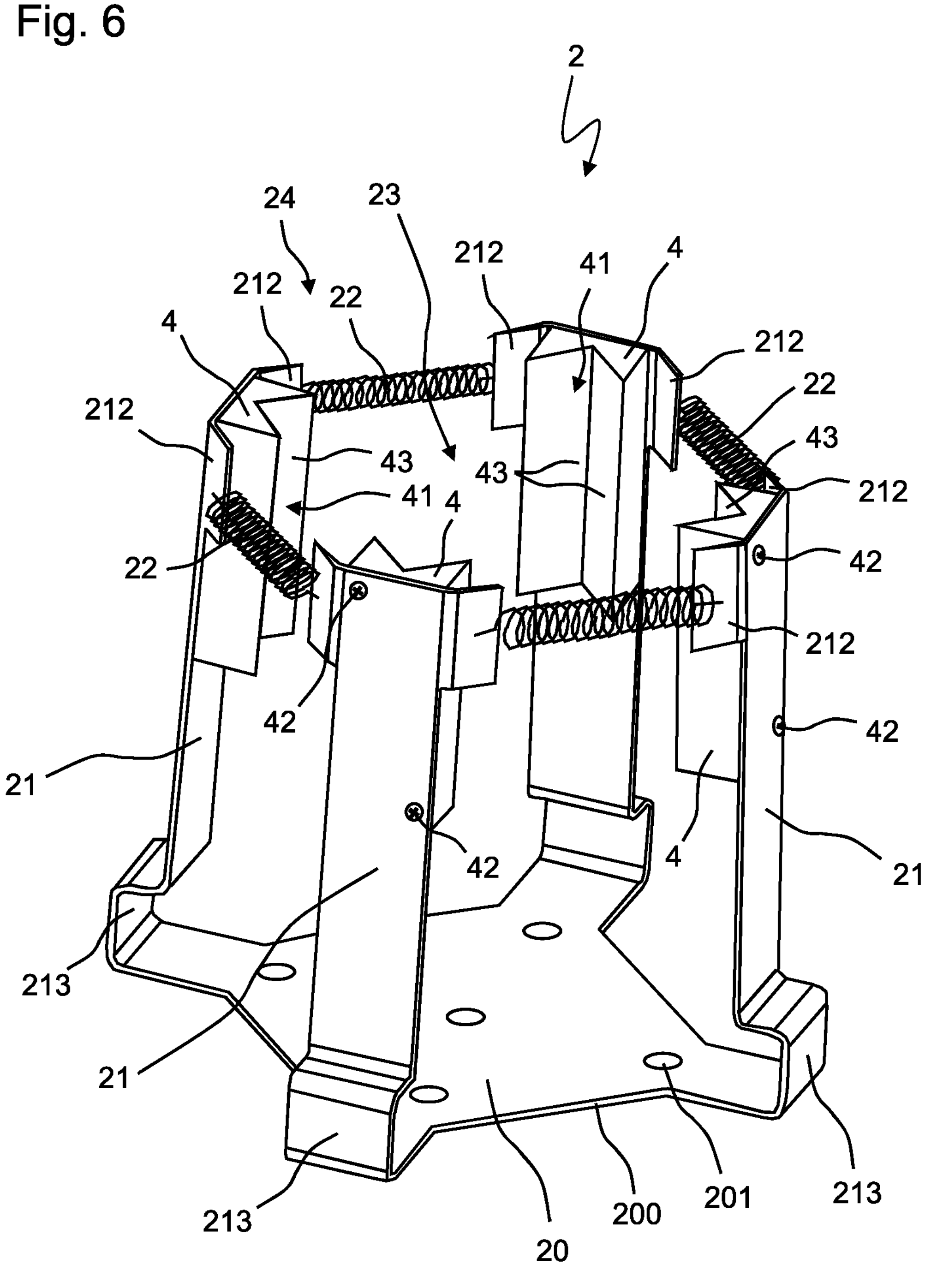
FIG. 6 shows a third embodiment of a holding clamp.

In the embodiment according to FIG. 6, four holding arms 21 are arranged at the four corners of the outer circumference 200 of the square base plate 20. In contrast to the previous embodiments, however, the holding arms 21 do not comprise a holding part 210. In other words, the holding arms 21 do not have any contact surface 215 integrated into the holding arm 21 itself. For this purpose, a vessel bearing 4 is arranged on each holding arm 21. The vessel bearing 4 is designed as a separate component and is detachably fastened to the holding arm 21. Alternatively, the vessel bearing could also be attached to the holding arm in a non-detachable manner and, for example, glued. Fastening devices 42 are provided for the detachable fastening, for example a screw connection in the embodiment shown, specifically two screw connections per vessel bearing 4. The detachable vessel bearing 4 can consist of a different material than the holding arms 21, for example a rubber material which, when in contact with the bottle 3, prevents wear and tear on the bottle 3 during operation of the laboratory shaking device 1, 5. Each vessel bearing 4 has two flat contact surfaces 43 which are arranged substantially perpendicular to one another and which together form a corner receptacle 41. The corner receptacle 41 is designed to contact a corner 32 of the angular bottle 3. For this purpose, the flat contact surfaces 43 are designed to come into contact with the flat side surfaces 31 of the bottle 3, which are connected over a corner 32, when the bottle 3 is located in the vessel receiving space 23 of the holding clamp 2. In the embodiment according to FIG. 6, the vessel receiving space 23 is delimited exclusively by the contact surfaces 43 of the vessel bearing 4 and the base plate 20. All other parts of the holding clamp 2 are located outside the vessel receiving space 23.

In the case of the holding clamp 2 according to FIG. 6, the spacer tabs 212 do not extend in the direction away from the vessel receiving space 23. Instead, the spacer tabs 212 extend substantially parallel to the side surfaces of the vessel receiving space 23 or to the side surfaces 31 of an angular vessel arranged in the vessel receiving space 23. In this embodiment, however, this is sufficient to ensure that tensile elements 22 are still located outside of the vessel receiving space 23, since the vessel bearings 4 extend from the holding arms 21 in the direction of the vessel receiving space 23 and onto the corresponding opposite vessel bearing 4. In this way, the corner receptacles 41 of the vessel bearing 4 and thus also the vessel receiving space 23 are arranged offset inward, whereby a sufficient spacing of the vessel receiving space 23 from the tensile elements 22 is achieved.

Figure 7:
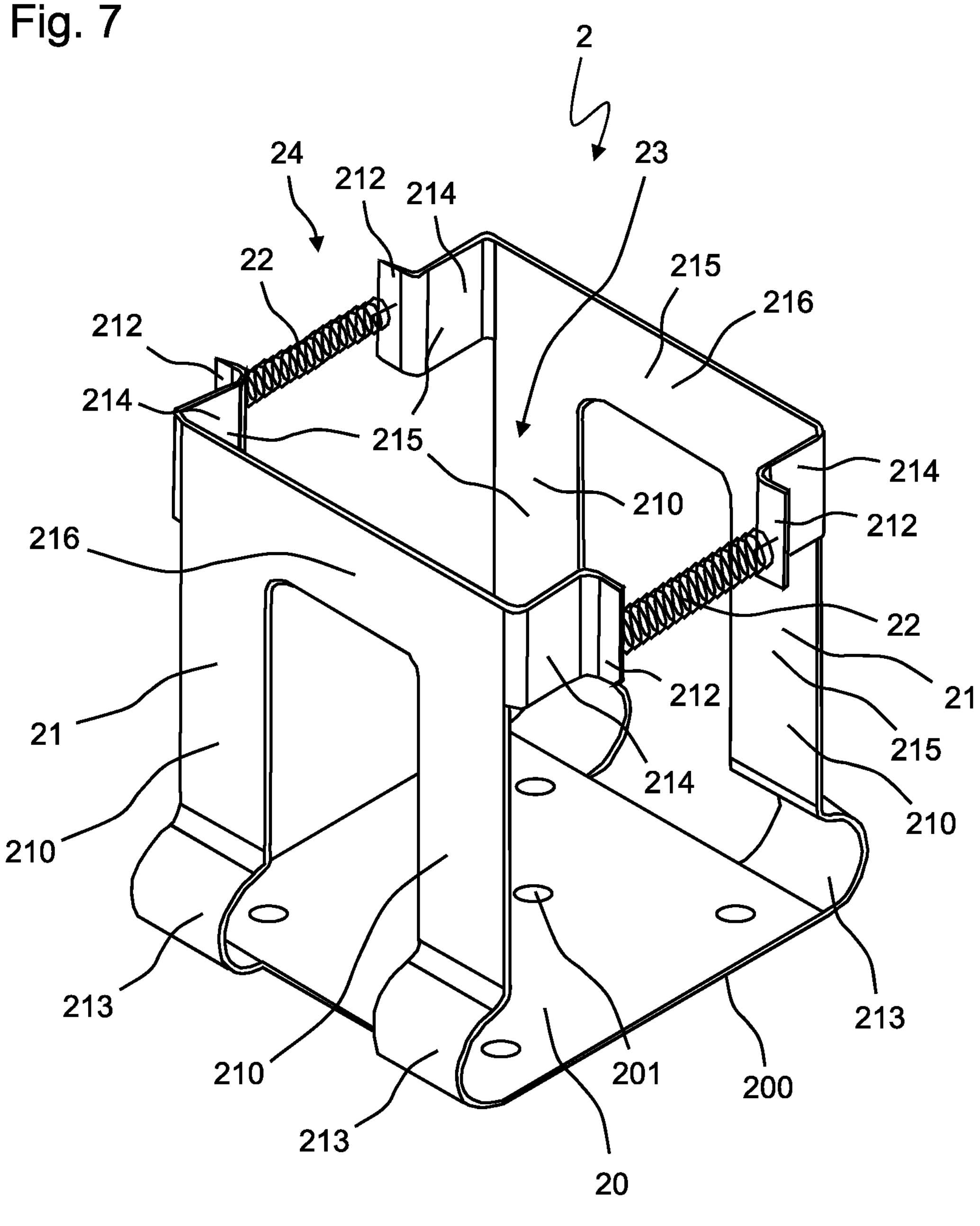
FIG. 7 shows a fourth embodiment of a holding clamp.

FIG. 7 shows a further embodiment of the holding clamp 2. The holding clamp 2 also has a base plate 20 with a square basic shape. In this case, too, a total of four holding arms 21 are provided which protrude from the base plate 20. The holding arms 21 are, however, only arranged on two opposite sides of the outer circumference 200 of the base plate 20. In contrast, the two other opposite sides of the outer circumference 200 do not have any holding arms 21. In addition, the holding arms 21 are offset off-center on the sides of the outer circumference 200, specifically in such a way that they reach up to the corners of the base plate 20 or are flush therewith. From here the holding arms 21 protrude upward from the base plate 20 substantially perpendicularly.

The holding arms 21 arranged on the same side of the outer circumference 200 are interconnected at their end facing away from the base plate 20 via a connecting part 216. In particular, the connecting part 216, together with the holding arms 21 and the base plate 20, is made in one piece and made of the same material. It also has a two-dimensional extension and, in particular, also comprises a flat contact surface 215, which can be brought into contact with one of the flat side surfaces 31 of the angular bottle 3. The contact surface 215 of the connecting part 216 is, in particular, formed parallel to the contact surface 215 of the holding part 210 of the holding arms 21. The holding parts 210 of the interconnected holding arms 21 and of the connecting part 216 form a common, coherent, flat contact surface 215 which can be brought into contact with one of the flat side surfaces 31 of the angular bottle 3.

In addition, the holding arms 21 connected via the connecting part 216 each also have a holding tab 214 which is arranged substantially perpendicular to the connecting part 216 and the holding parts 210 of the holding arms 21. As already described above, the holding tabs 214 each have a further contact surface 215, which is arranged substantially perpendicular to the common contact surface 215 of the connecting parts 216 and the holding parts 210. The holding tabs 214 on the connected holding arms 21 lie opposite one another, in particular with respect to the vessel receiving space 23. In this way, it is possible that the common contact surface 215 of the connecting parts 216 and the holding parts 210 is extended substantially from one corner 32 of the bottle 3 over an entire flat side surface 31 of the bottle 3 to a further corner 32. The common contact surface 215 therefore comes into contact with the bottle 3 over the entire side surface 31 when the bottle 3 is placed in the vessel receiving space 23. In addition, the two corners 32 delimiting this side surface 31 are also encompassed by the holding tabs 214, which come into contact with the other side surfaces 31 of the bottle 3 connected to this corner 32.

A spacer tab 212 projecting away from the vessel receiving space 23 is arranged on each of the holding tabs 214. On the side of the outer circumference 200 of the base plate 20 opposite the connected holding arms 21, two further connected holding arms 21 are arranged, which are designed mirror-symmetrically to the first pair of connected holding arms 21 with respect to the vessel receiving space 23. Two tensile elements 22 are stretched between the two interconnected pairs of holding arms 21 via the spacer tabs 212. The embodiment according to FIG. 7 therefore manages with only two tensile elements 22, which are each arranged parallel to a side surface of the vessel receiving space 23 or to a side surface 31 of the bottle 3. Due to the particularly large-area contact of the holding clamp 2 with the angular bottle 3 as soon as it is placed in the vessel receiving space 23, a particularly secure fastening of the bottle 3 in the holding clamp 2 is achieved with the embodiment according to FIG. 7. As seen in the Figures, a holding arm 21 and an end edge of a spacer tab 212 associated with the holding arm extend generally along a vertical direction.

Figure 8:
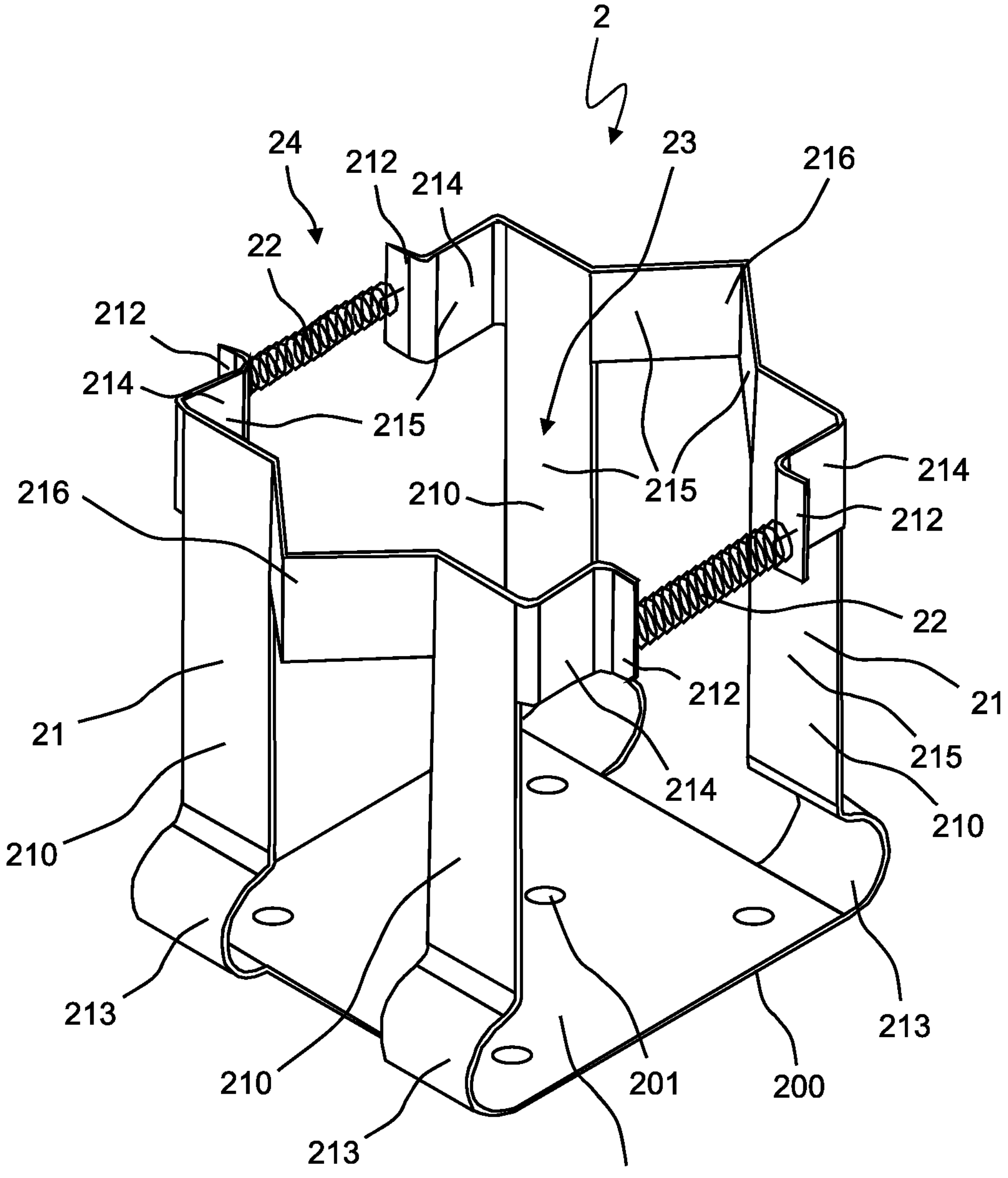
FIG. 8 shows a fifth embodiment of a holding clamp.

The embodiment according to FIG. 8 largely corresponds to that according to FIG. 7, which is why reference is made to these explanations to avoid repetition. In contrast to the previous embodiment, the connecting part 216 does not have a contact surface 215 arranged parallel to the contact surface 215 of the holding part 210. In contrast thereto, the connecting part 216 in the embodiment according to FIG. 8 is designed as a corner protruding outward; in other words, away from the vessel receiving space 23. In particular, the connecting part 216 thereby comprises two flat contact surfaces 215 which are arranged substantially perpendicular to one another and which are designed to be in contact with two side surfaces 31 of the bottle 3 which are interconnected over a corner 32. In other words, the connecting part 216 is designed to receive a corner 32 of the bottle 3 stored in the vessel receiving space 23. In this way, it is possible to achieve two different set positions for the angular bottle 3 in one and the same holding clamp 2. One set position corresponds to that of the embodiment according to FIG. 7, in which position the corners 32 of the bottle 3 are arranged at the connection point between the holding tabs 214 and the holding arms 21. The further set position is arranged substantially offset by 45° with respect to this position, namely in such a way that two corners 32, which are diagonally opposite on the bottle 3, are received by the connecting parts 216. The two other corners 32 of the angular bottle 3, on the other hand, are aligned toward the two tensile elements 22, although in this case there is no contact between these corners 32 and the tensile elements 22 due to the spacing, in particular due to the spacer tabs 212. By providing these two different set positions, the use of the holding clamp 2 is particularly flexible. In principle, the two set positions can be designed for bottles 3 of the same size. However, the two set positions are designed for bottles 3 of different sizes. By arranging and dimensioning the connecting parts 216 accordingly, it is possible, for example, to fix two different size classes of angular bottles 3 in the same holding clamp 2. In order to ensure a sufficient spacing of the corners 32 of the bottle 3 from the tensile elements 22, the set position in which two corners 32 of the bottle 3 are received by the connecting parts 216 comprises a smaller vessel receiving space 23 than the set position in which the corners 32 of the bottle 3 are received by the holding tabs 214 and the holding parts 210.

All in all, the present invention allows secure, low-wear and easy-to-use fixing of an angular bottle 3 or other angular vessel in a holding clamp 2 on a shaking platform 12, 53.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The present invention in its broader aspects is therefore not limited to the specific details and illustrative examples shown and described. Accordingly, departures may be made from such details without departing from the scope of the general inventive concept.

What is claimed is:

1. A holding clamp for holding a bottle with flat side surfaces on a shaking platform of a laboratory shaking device comprising:

a base plate having a fastening device for fastening the holding clamp on the shaking platform;

at least two holding arms which protrude from the base plate and which form a vessel receiving space arranged between the holding arms, wherein each of the least two holding arms has at least one spacer tab that is arranged entirely outside the vessel receiving space and protrudes from the corresponding holding arm in a direction away from the vessel receiving space; and a plurality of resilient tensile elements, at least one of said resilient tensile element elements connecting spacer tabs of adjacent said holding arms, wherein at least one flat contact surface designed for contact with the bottle is arranged on each of the at least two holding arms, and wherein the at least two holding arms are designed such that the flat contact surface can be brought into contact two-dimensionally with one of the flat side surfaces of the angular bottle.

2. The holding clamp according to claim 1, wherein the at least two holding arms each have a holding part formed in one piece with the corresponding holding arm, the holding part having the at least one flat contact surface.

3. The holding clamp according to claim 2, wherein a holding tab is arranged on at least one of the at least two holding arms, the holding tab having a contact surface and being designed such that the contact surface can be brought into contact two-dimensionally with one of the flat side surfaces of the angular bottle.

4. The holding clamp according to claim 3, wherein the contact surface of the holding tab is arranged substantially perpendicular to the flat contact surface of the holding part.

5. The holding clamp according to claim 1, wherein a detachable vessel bearing is arranged on a holding arm of the at least two holding arms and the detachable vessel bearing can be fastened to the holding arm with a fastening device, the detachable vessel bearing having the at least one flat contact surface.

6. The holding clamp according to claim 5, wherein the detachable vessel bearing has at least two flat contact surfaces which are interconnected over a corner, and wherein the holding arm on which the detachable vessel bearing is arranged is designed such that the two flat contact surfaces can be brought into contact two-dimensionally with two flat side surfaces of the angular bottle, which side surfaces are connected over a corner.

7. The holding clamp according to claim 1, wherein two holding arms of the at least two holding arms are interconnected via a connecting part in a region remote from the base plate, the connecting part also having a flat contact surface and being designed such that the flat contact surface can be brought into contact two-dimensionally with one of the flat side surfaces of the angular bottle.

8. The holding clamp according to claim 7, wherein the connecting part has at least two flat contact surfaces which are interconnected over a corner, and in that the holding arms interconnected via the connecting part are designed such that the two flat contact surfaces can be brought into contact two-dimensionally with two flat side surfaces of the angular bottle, which side surfaces are connected over a corner.

9. The holding clamp according to claim 1, wherein a holding arm of the at least two holding arms has a guide part, the guide part being arranged on a side of the holding arm facing away from the base plate and being angled away from the vessel receiving space.

10. The holding clamp according to claim 9, wherein a resilient tensile element of the plurality of resilient tensile elements is arranged on the guide part and outside the vessel receiving space.

11. The holding clamp according to claim 1, wherein the spacer tabs and the plurality of resilient tensile elements are designed in such a way that the plurality of resilient tensile elements is arranged outside the vessel receiving space, wherein the at least two holding arms have a guide part, the guide part being arranged on a side of the corresponding holding arm facing away from the base plate and being angled away from the vessel receiving space, and wherein the spacer tabs extend from the guide part.

12. The holding clamp according to claim 1, wherein the plurality of resilient tensile elements comprises two resilient tensile elements, the two resilient tensile elements being arranged on two opposite sides of the vessel receiving space.

13. The holding clamp according to claim 1, wherein a holding arm of said holding arms has a deformation arc, the deformation arc being designed such that a distance between said holding arm and a holding arm opposite said holding arm opposite ones of said holding arms with respect to the vessel receiving space can be changed.

14. The holding clamp according to claim 13,
wherein the deformation arc is arranged between the base plate and the at least one flat contact surface on the holding arm.

15. The holding clamp according to claim 13, wherein two holding arms are opposite one another and the distance from one another can be changed by means of the deformation arc.

16. The holding clamp according to claim 1,
further comprising at least one of the following features:
(i) the at least two holding arms comprise four identically designed holding arms;
(ii) the at least two holding arms protrude substantially perpendicularly from the base plate;
(iii) the base plate has a rectangular basic shape;
(iv) the at least two holding arms are arranged on an outer circumference of the base plate;
(v) the at least two holding arms are arranged opposite one another with respect to the base plate and/or the vessel receiving space;
(vi) the at least two holding arms are designed to contact side surfaces of the angular bottle with the flat contact surfaces;
(vii) the at least two holding arms are designed to contact corners of the angular bottle with the contact surfaces;
(viii) the at least two holding arms, together with the plurality of resilient tensile elements, form an opening ring which completely surrounds the vessel receiving space on a side of the holding clamp facing away from the base plate; or
(ix) the opening ring is additionally formed by one or more of the elements of a group consisting of guide part, a spacer tab, a holding tab, and a connecting part.

17. The holding clamp according to claim 1,
further comprising at least one of the following features:
(i) the at least two holding arms are arranged on sides of an outer circumference of a base plate with a rectangular basic shape;
(ii) a holding arm is arranged on each side of an outer circumference of the base plate with a rectangular basic shape;
(iii) the at least two holding arms are arranged centrally on sides of an outer circumference of the base plate,
(iv) the at least two holding arms are arranged offset off-center on sides of an outer circumference of the base plate; or
(v) the at least two holding arms are arranged on two opposite sides of an outer circumference of the base plate, the other opposite sides of the outer circumference of the base plate not having any holding arms.

18. The holding clamp according to claim 1,
wherein the base plate defines a circumference having corners and wherein the at least two holding arms comprise at least one of the following features:
the at least two holding arms are arranged at the corners of an outer circumference of the base plate; or
a holding arm of the at least two holding arms is arranged at each of the corners of the outer circumference of the base plate.

19. The holding clamp according to claim 1, wherein a holding arm and an end edge of a said spacer tab associated with the holding arm extend generally along a vertical direction.

* * * * *